Aug. 25, 1931.  R. WINTZER  1,820,588
STEAM ENGINE VALVE
Filed May 28, 1924
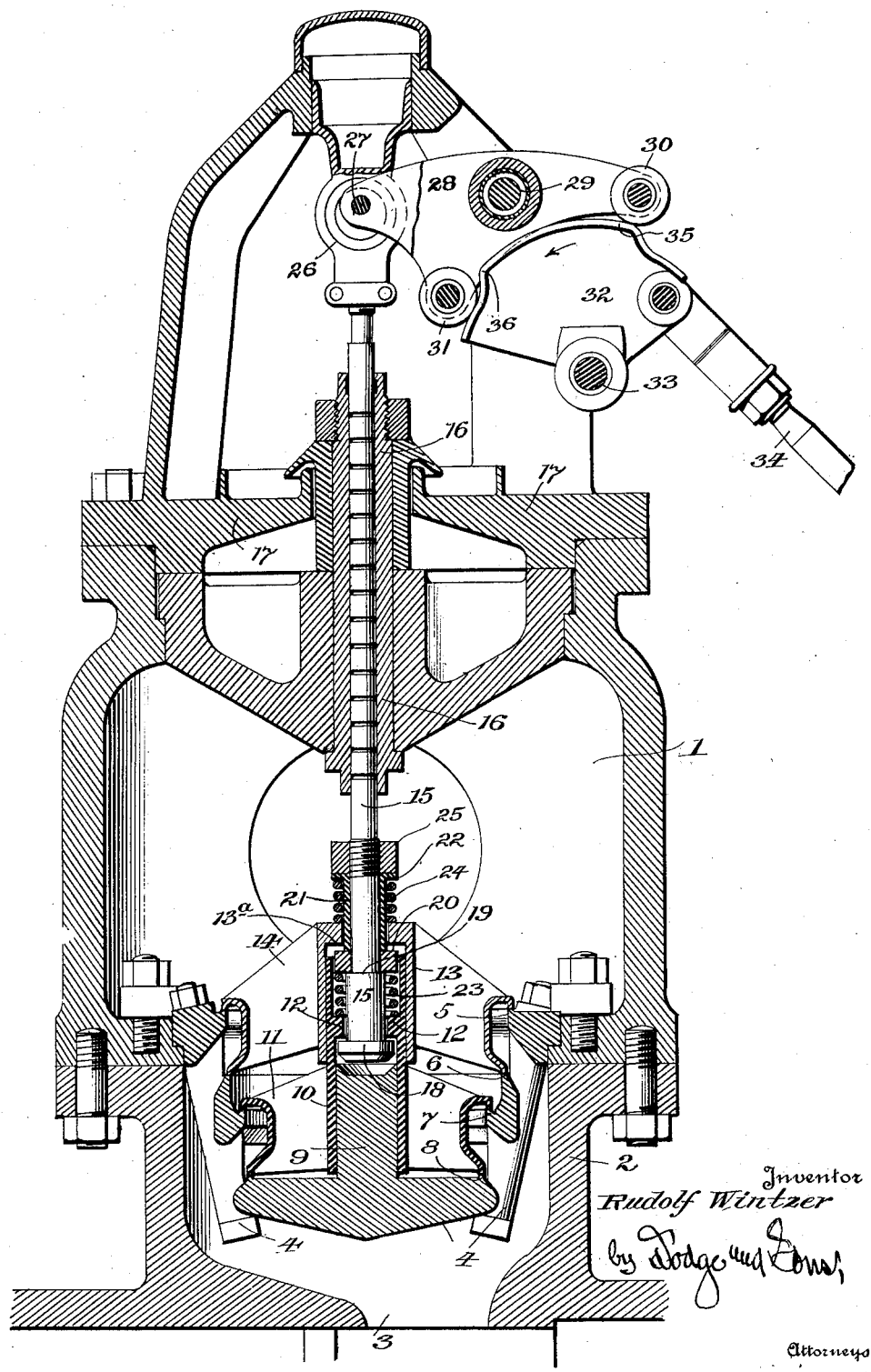
Inventor
Rudolf Wintzer
by Dodge and Sons,
Attorneys.

Patented Aug. 25, 1931

1,820,588

UNITED STATES PATENT OFFICE

RUDOLF WINTZER, OF MILWAUKEE, WISCONSIN, ASSIGNOR TO NORDBERG MANUFACTURING COMPANY, OF MILWAUKEE, WISCONSIN, A CORPORATION OF WISCONSIN

STEAM ENGINE VALVE

Application filed May 28, 1924. Serial No. 716,463.

This invention pertains to steam engine valves and more particularly to valves of the poppet type.

Poppet valves of various forms have heretofore been designed and employed with considerable success but when such valves are utilized in conjunction with large cylinders or engines running at high piston speeds the valves become very large and have to be lifted high in order to produce the required valve area. In such cases it has been customary to increase the number of seats by superimposing two or even three valves, one above the other, the valves being cast together on a single hub. Certain disadvantages of construction and operation are inherently present under such arrangement, among others being that the lower portion of the valve must be made considerably smaller than the upper part in order to ensure a sufficiently large passage for the steam under the upper part, which arrangement results in the valve being far less balanced than in the usual double beat valve. Furthermore, it is far more troublesome to make tight a four seated valve than a double seated one. A double beat valve while more nearly approaching the ideal conditions does not give the necessary or required valve area when utilized in connection with large cylinders or engines running at high piston speeds.

The present invention has for its main object the production of a duplex double beat valve wherein the difficulties and objections above noted, among others, are overcome and a construction provided which is at once relatively simple and which produces a valve which will readily and effectively seat and is substantially balanced, thus rendering the whole valve system easy to operate.

In the drawing there is illustrated, in sectional elevation, a valve and its operating lever and cam embodying my invention.

The steam chest denoted by 1 is secured to the valve chamber 2, which latter is provided with a port 3 opening into the engine cylinder.

Secured within the valve chamber is a valve cage denoted generally by 4 and having four valve seats 5, 6, 7 and 8. Said cage is preferably formed as a single casting and extending upwardly from the lower portion thereof is a centrally disposed post or stem 9 which forms a guide for the elongated hub 10 of the lower valve element 11. Said valve element, as will be seen, closes upon the seats 7 and 8 and is of spider formation as usual, to permit the steam to pass therethrough when the valve is lifted. Hub 10 is provided with an inwardly projecting shoulder or flange 12. The upper portion of hub 10 forms a guide for the hub 13 of the upper valve member 14, which, like the lower valve element, is of spider formation, and is designed to seat upon the seats 5 and 6.

An actuating valve stem or rod 15 extends down through a suitable guide and packing element 16 mounted in the valve bonnet 17, the stem or rod having a head 18 formed on its lower end which lies below the shoulder 12. The stem is likewise shouldered as at 19 to form a seat for a washer or ring 20 upon the upper face of which rests the lower end of a sleeve 21, the upper end whereof is provided with an out-turned flange or collar 22.

A spring 23 encircles the rod 15, said spring bearing at its ends upon the upper face of shoulder 12 and the lower face of collar 20. A second spring 24 encircles sleeve 21 and bears against the flange 22 thereof and against the upper inwardly projecting portion of hub 13.

A nut 25 mounted upon the threaded portion of the valve rod bears against the flange 22 and serves to hold the valve elements in assembled position.

Secured to the upper end of the valve stem or rod 15 is a cross head 26 to which is attached as at 27 one end of a lever 28 fulcrumed at 29. Said lever at its outer end carries a roller 30 which may be termed the closing roller, while secured to a downward extension of the lever is a second roller 31, termed the opening roller.

A cam member 32 fulcrumed at 33 and designed to be rocked through the link or rod 34 is provided with cam faces 35 and 36 designed to coact respectively with the rollers 30 and 31.

As will be seen upon reference to the drawing, the clearance between the upper face of head 18 and the under face of shoulder 12 is somewhat less than the clearance between the upper face of collar 20 and the under face of the inwardly projecting portion 13a of hub 13. While such arrangement or proportioning of the parts is not essential, it is advantageous, as will hereinafter appear.

In the drawing the valve is shown in its fully closed position, springs 23 and 24 being at such time under slight compression with both valve elements 11 and 14 fully and fairly seated.

Assume now that the cam member 32 is shifted in the direction of the arrow, lifter face 36 thereof will, acting through roller 31, force the inner end of lever 28 upwardly and thereby elevate the rod or stem 15. The first effect is to cause the head 18 to abut the shoulder 12 and to immediately raise valve element 11 from its seats. Such unseating of the lower valve element allows steam to pass into the cavity of the valve chamber 2 which will partly balance the upper valve element 14 and thus render the whole valve system easier to operate. This follows from the fact that valve element 14 has a closing tendency when both valve elements are seated because the diameter of its seat 5 exceeds the diameter of its seat 6; but when valve element 11 opens pressure within and without the valve element 14 is substantially equalized instantly since both valves discharge into a single chamber. Consequently the closing tendency of valve element 14 is reduced to a negligible value by the initial opening of valve element 11. A continued upward movement of the stem causes the upper element 14 to be raised and the two elements then move up as one.

A reverse movement of element 32 rocks lever 28 counter-clockwise and forces the stem 15 downwardly forcing the valve elements to their seats.

The movement imparted to the stem by the cam face 35 is slightly in excess of that required to seat the valves and such excess movement is compensated for by the interpositioning of the springs 23 and 24, which are quite strong, between the fixed elements on the stem and the hubs of the valve elements.

When the closing cam has moved the valve down into closing position, bringing the valve faces into contact with their seats, the extreme part of said cam presses the valve stem a little further downward and compresses the springs. Without these springs, that is, with a rigid connection between the valve elements, the stem and the lever 28, all parts of the valve gear would have to be made and adjusted so accurately that when the cam face 35 and the roller 30 are in the position shown in the drawing the valve must rest firmly upon its seats. It is almost impossible to attain such accuracy in the workmanship, but even if it were done the slightest wear of cam, roller or valve seat, or the expansion of the parts due to heat, would render the valve leaky. The surplus closing movement of the closing cam which compresses the springs ensures seating of the valve independent of wear, expansion, or inaccuracy of workmanship.

Another advantage of the springs resides in the fact that they automatically take up any wear of shoulders on the valve stem and valve hub.

From the foregoing description it will be seen that I have produced in effect what may be termed a duplex double beat valve, the members or elements whereof act serially in opening, which action, as above noted, partially balances the valve.

I am aware that it is not new to employ double valves and quadruple ports with the seats formed in a one-piece valve cage. With such constructions, however, in order to obtain a sufficiently large passage of steam under the upper part of the lower portion of the valve, it is necessary to make the lower portion of the valve considerably smaller than the upper portion and thus the annular areas which are acted upon by the steam pressure become very large and, as a consequence, the valve is by far less balanced than the usual double beat valve. Furthermore such double valves are difficult to initially seat and even more so to maintain tight under working conditions. The present structure does away with these difficulties and imperfections in structure and operation.

What I claim is:

1. In a valve the combination of a valve cage having four seats defining ports leading to a common passage; a pair of double beat valve elements co-operating with said seats, said elements being separately formed; a hollow hub extending upwardly from the lower element; a hub on the upper element, said hub being guided on the first named hub; an actuating stem extending downwardly into the first hub; a connection between said stem and hub; means causing the valve elements to move as one when the lower element is moved slightly from its seat; and means for imparting endwise movement to the stem.

2. In a valve, the combination of a valve cage having four seats and an upwardly extending central post; a valve element closing on the lower pair of seats, said element having a hub positioned on the post with an inwardly projecting shoulder; a second valve element closing on the upper pair of seats, said element having a hub slidably mounted upon the upper portion of the first named hub and having an inwardly projecting portion at its upper end; a stem extending downwardly through said hubs, said stem having a head at its lower end located below the inwardly projecting shoulder; and means for actuating the stem.

In testimony whereof I have signed my name to this specification.

RUDOLF WINTZER.